(12) United States Patent
Okuyama et al.

(10) Patent No.: US 7,597,446 B2
(45) Date of Patent: Oct. 6, 2009

(54) ILLUMINATION OPTICAL SYSTEM AND IMAGE PROJECTION APPARATUS

(75) Inventors: Atsushi Okuyama, Tokorozawa (JP); Takashi Sudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 523 days.

(21) Appl. No.: 11/539,230

(22) Filed: Oct. 6, 2006

(65) Prior Publication Data
US 2007/0085971 A1    Apr. 19, 2007

(30) Foreign Application Priority Data
Oct. 7, 2005    (JP) .............................. 2005-295183

(51) Int. Cl.
G03B 21/14    (2006.01)
G03B 21/28    (2006.01)
G02F 1/1335   (2006.01)

(52) U.S. Cl. ................................. 353/20; 353/81; 349/5
(58) Field of Classification Search ................... 353/20, 353/33, 81; 349/5, 7, 8, 9, 10; 359/437, 359/495, 496, 304
See application file for complete search history.

(56) References Cited

U.S. PATENT DOCUMENTS

| | | | |
|---|---|---|---|
| 5,327,270 A * | 7/1994 | Miyatake | 349/9 |
| 6,344,929 B1 | 2/2002 | Sugawara | |
| 6,398,364 B1 * | 6/2002 | Bryars | 353/31 |
| 6,802,610 B2 * | 10/2004 | Lee | 353/20 |
| 6,942,345 B2 * | 9/2005 | Okuyama et al. | 353/20 |
| 6,942,347 B2 * | 9/2005 | Sugawara et al. | 353/33 |
| 7,196,743 B2 * | 3/2007 | Abe et al. | 349/5 |
| 7,222,967 B2 * | 5/2007 | Okuyama et al. | 353/31 |
| 7,261,418 B2 * | 8/2007 | Ma et al. | 353/20 |
| 2005/0041165 A1 * | 2/2005 | Abe et al. | 349/5 |

FOREIGN PATENT DOCUMENTS

JP    2-250026    10/1990

* cited by examiner

Primary Examiner—William C Dowling
Assistant Examiner—Ryan Howard
(74) Attorney, Agent, or Firm—Rossi, Kimms & McDowell LLP

(57) ABSTRACT

An illumination optical system is disclosed which capable of uniformly illuminating a surface to be illuminated. The illumination optical system comprises a polarization conversion element which converts a luminous flux from a light source into a luminous flux having a certain polarization direction, a polarization beam splitter which splits the luminous flux from the polarization conversion element, and a phase plate which gives a phase difference to the luminous flux from the polarization beam splitter. The system illuminates the surface with the luminous flux from the phase plate and satisfies the conditions $\theta x < \theta y$ and $0° < \phi y < \theta y$. $\theta x$ and $\theta y$ represent the maximum incident angles onto the surface in the x and y directions, and $\phi y$ represents an incident angle onto the phase plate at which the phase difference at a principal wavelength of the luminous flux that passes through the phase plate is 90 degrees.

5 Claims, 9 Drawing Sheets

ILLUMINATION OPTICAL SYSTEM AND IMAGE PROJECTION APPARATUS

BACKGROUND OF THE INVENTION

The present invention relates to illumination optical systems and image projection apparatuses with the same, the illumination optical systems being suitable for liquid crystal projectors which project an enlarged image corresponding to an original image displayed on a liquid crystal panel (image display element) onto a screen, for example.

Conventionally, various image projection apparatuses (liquid crystal projectors) have been proposed, which project an enlarged image corresponding to an original image displayed on an image display element, such as a liquid crystal display element (liquid crystal panel), onto a screen.

Image projection apparatuses are well known, which use a reflective liquid crystal display element as the image display element (see Japanese Patent Laid-Open No. H02-250026). The image projection apparatus disclosed in Japanese Patent Laid-Open No. H02-250026 uses a polarization beam splitter as a means to introduce illumination light to the reflective liquid crystal display element and analyze light from the reflective liquid crystal display element.

Further, the image projection apparatus disclosed in Japanese Patent Laid-Open No. H02-250026 is provided with a quarter-phase plate as a means to prevent deterioration of contrast caused by a difference in inclination of polarized light in the polarization beam splitter, the quarter phase plate being located between the polarization beam splitter and the reflective liquid crystal display element.

In addition, color liquid crystal projectors are known, in which three image display elements (liquid crystal display elements) for R(red) light, G(green) light and B(blue) light are illuminated with respective color light components generated by color-separation of light from a light source (see Japanese Patent Laid-Open No.2000-305171). The color light components from the three image display elements are combined by a color-combining means and projected through a single projection lens on a screen or the like.

In recent years, image projection apparatuses need to project brighter images. Especially lately, illumination optical systems need to illuminate the reflective liquid crystal display element more brightly, compared to illumination optical systems (dark illumination optical systems) in which the incident angle of light onto the reflective liquid crystal display element is small (that is, its F-number is large (dark)) to emphasize contrast of projection images.

Therefore, it is necessary to increase the incident angle of light onto the reflective liquid crystal display element for achieving an illumination optical system (bright illumination optical system) capable of illuminating the reflective liquid crystal display element brightly and to improve contrast of projection images.

In Japanese Patent Laid-Open No. H02-250026, the phase plate utilizes a difference (phase difference) between the phase of light in the fast axis direction and the phase of light in the slow axis direction; the phase difference relates to the thickness of the phase plate. The thickness of the phase plate does not become a problem in terms of optical performance since the angle range in which light passes through the phase plate in the dark illumination optical systems is narrow.

However, in the bright illumination optical systems, since the distance (optical path length) through which light incident on the phase plate at the normal angle passes is different from the distance through which the light incident on the phase plate at a large angle passes, a phenomenon in which the phase differences are different in the same phase plate depending on the incident angles.

Consequently, correction of the inclination of the polarized light in the polarization beam splitter is not performed sufficiently, which deteriorates image contrast.

BRIEF SUMMARY OF THE INVENTION

One of the objects of the present invention is to provide an illumination optical system capable of uniformly illuminating a surface to be illuminated such as an image display element. Another of the objects of the present invention is to provide an image projection apparatus capable of projecting a bright image with high contrast by using the above illumination optical system.

According to an aspect, the present invention provides an illumination optical system which comprises a light source, a polarization conversion element which converts a luminous flux from the light source into a luminous flux having a certain polarization direction, a polarization beam splitter which splits the luminous flux from the polarization conversion element according to the polarization state of the luminous flux, and a phase plate which gives a phase difference to the luminous flux from the polarization beam splitter. The illumination optical system illuminates a surface to be illuminated with the luminous flux from the phase plate and satisfies the following conditions:

$$\theta x < \theta y$$

$$0° < \phi y \leq \theta y$$

where a direction which is orthogonal to one of fast and slow axes of the phase plate and in which the luminous flux is reflected and split by the polarization beam splitter is defined as the x direction, a direction which is orthogonal to the other of the fast and slow axes and to the x direction is defined as the y direction, $\theta x$ and $\theta y$ represent the maximum incident angles of the luminous flux onto the surface to be illuminated in the x and y directions, respectively, and $\phi y$ represents an incident angle of the luminous flux onto the phase plate at which the phase difference at a principal wavelength of the luminous flux that passes through the phase plate is 90 degrees.

According to another aspect, the present invention provides an image projection apparatus which comprises an image display element, an illumination optical system which illuminates the image display element, and a projection optical system which projects a luminous flux from the image display element onto a projection surface. The illumination optical system comprises a light source, a polarization conversion element which converts a luminous flux from the light source into a luminous flux having a certain polarization direction, a polarization beam splitter which splits the luminous flux from the polarization conversion element according to the polarization state of the luminous flux, and a phase plate which gives a phase difference to the luminous flux from the polarization beam splitter. The illumination optical system illuminates the image display element with the luminous flux from the phase plate and satisfies the following conditions:

$$\theta x < \theta y$$

$$0° < \phi y \leq \theta y$$

where a direction which is orthogonal to one of fast and slow axes of the phase plate and in which the luminous flux is reflected and split by the polarization beam splitter is defined as the x direction, a direction which is orthogonal to the other of the fast and slow axes and to the x direction is defined as the y direction, θx and θy represent the maximum incident angles of the luminous flux onto the image display element in the x and y directions, respectively, and φy represents an incident angle of the luminous flux onto the phase plate at which the phase difference at a principal wavelength of the luminous flux that passes through the phase plate is 90 degrees.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will be described with reference to the accompanying drawings.

Embodiment 1

Figure 1:
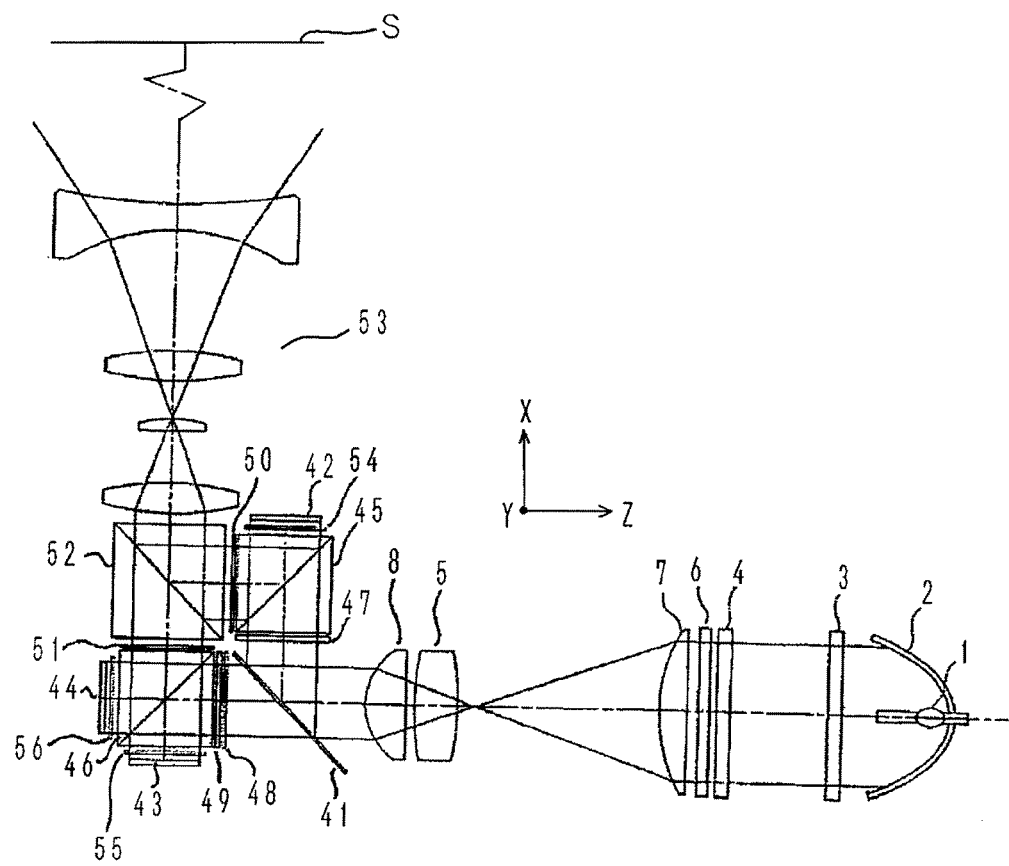
FIG. 1 is a schematic view showing the main part of the image projection apparatus that is Embodiment 1 of the present invention.

FIG. 1 schematically shows the configuration of the main part of the image projection apparatus that is Embodiment 1 of the present invention.

Figure 2A:
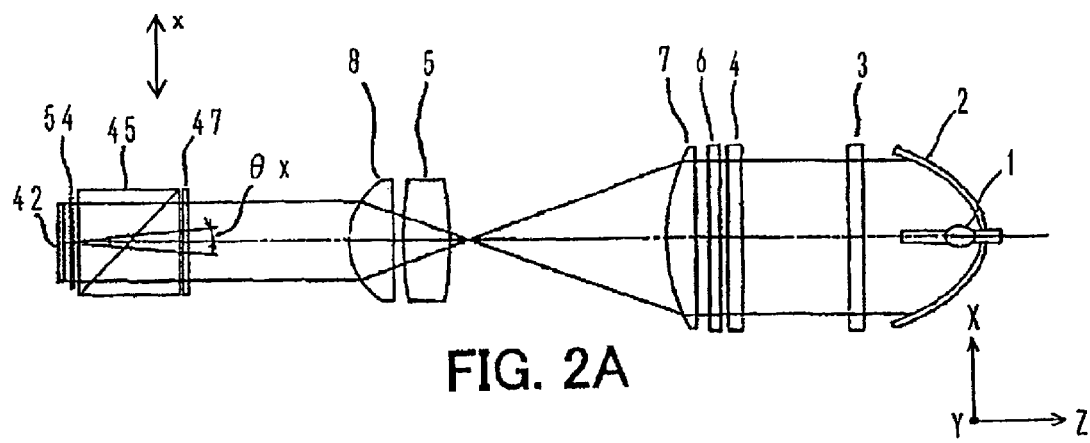
FIGS. 2A, 2B and 2C are explanatory diagrams showing the illumination optical system in Embodiment 1.
Figure 2B:
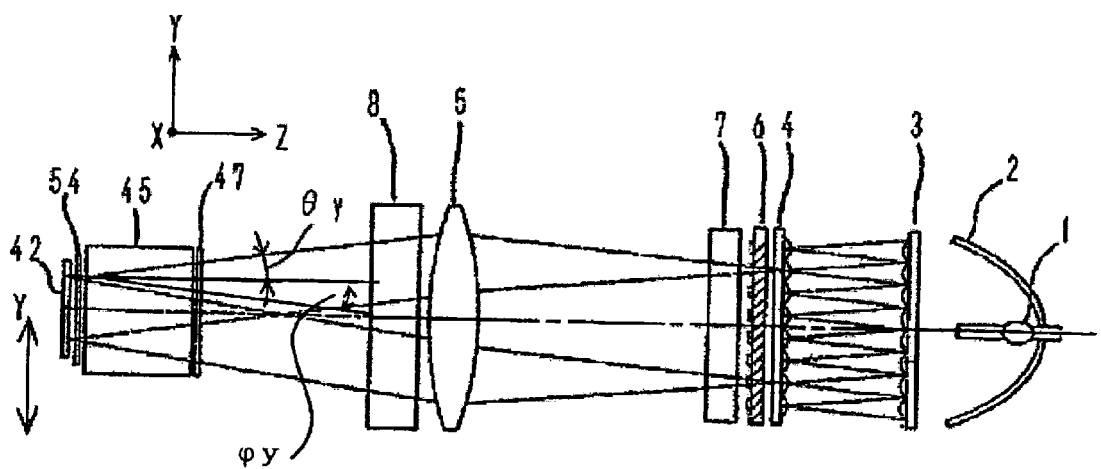
Figure 2C:
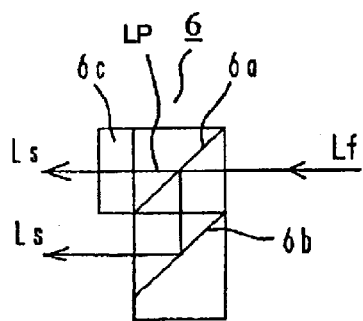

FIGS. 2A, 2B and 2C show part of the illumination optical system extracted from the image projection apparatus shown in FIG. 1 for explaining optical paths.

FIG. 2A is a cross sectional view showing the XZ cross-section of the part of the illumination optical system shown in FIG. 1, and FIG. 2B is a cross sectional view showing the YZ cross-section orthogonal to the XZ cross-section of FIG. 2A.

In FIG. 1, 1 denotes a light source, and 2 a reflector. 3 and 4 denote first and second lens arrays each constituted by plural cylindrical lenses. These lens arrays 3 and 4 constitute part of a luminous flux splitting member.

6 denotes a polarization conversion element which converts non-polarized light into polarized light having a certain polarization direction. 5 denotes a condenser lens. 7 and 8 denote first and second cylindrical lenses, respectively.

41 denotes a dichroic mirror. 42, 43 and 44 denote reflective liquid crystal display elements which display images for G(green) light, R(red) light and B(blue) light, respectively. 45 and 46 denote first and second polarization beam splitters, respectively.

47 and 48 denote first and second polarizing plates, respectively. 49 denotes a color-selective phase plate which converts the polarization state (rotates the polarization direction) of the R light by 90 degrees and does not convert the polarization state of the B light. 50 and 51 denote third and fourth polarizing plates, respectively. 52 denotes a dichroic polarization prism which has a characteristic in which it reflects the G light, transmits the B light, reflects an unnecessary polarized light component of the R light and transmits a projecting polarized light component of the R light. 53 denotes a projection lens (or projection optical system). 54, 55 and 56 denote phase plates made of quartz for G, R and B, respectively.

The first and second lens arrays 3 and 4 have refractive power only in the YZ cross-section shown in FIG. 2B. The first and second cylindrical lenses 7 and 8 have refractive power only in the XZ cross-section shown in FIG. 2A. The condenser lens 5 has rotationally symmetric surfaces.

The illumination optical system of Embodiment 1 splits the luminous flux from the light source 1 into plural luminous fluxes by the lens arrays 3 and 4 that constitute the luminous flux splitting member.

Then the illumination optical system uniforms the direction of the luminous fluxes from the lens arrays 3 and 4 by the polarization conversion element 6 and causes the luminous fluxes to exit therefrom.

Next, the illumination optical system splits the luminous fluxes from the polarization conversion element 6 by the polarization beam splitters 45 and 46 according to its polarization states.

Then the illumination optical system gives phase differences to the luminous fluxes from the polarization beam splitters 45 and 46 by the phase plates 54, 55 and 56. The illumination optical system illuminates the reflective liquid crystal display elements 42, 43 and 44 with the luminous fluxes from the phase plates 54, 55 and 56, respectively.

In this embodiment, a direction which is orthogonal to one of the fast and slow axes of each phase plate and in which the luminous fluxes are reflected and split by the polarization beam splitters 45 and 46 is defined as the x direction, and a direction which is orthogonal to the other of the fast and slow axes of each phase plate and to the x direction is defined as the y direction.

In addition, the maximum incident angles of the luminous flux onto each image display element in the x and y directions are defined as θx and θy, respectively.

Further, an incident angle of the luminous flux onto the phase plate at which the phase difference at a principal wavelength of the luminous flux that passes through the phase plate is 90 degrees is defined as φy.

In this case, the illumination optical system satisfies the following conditions:

$$\theta x < \theta y \tag{1}$$

$$0° < \phi y \leq \theta y \tag{2}$$

Especially in this embodiment, the maximum incident angle θy and the incident angle φy satisfy the following conditions:

$$10° < \theta y \quad (3)$$

$$\theta y/2 < \phi y \leq \theta y \quad (4).$$

Satisfying the conditional expressions (1) and (2) minimizes leakage light of illumination light having a certain incident angle spread, thereby facilitating an improvement of contrast of projection images. In addition, making the incident angle θy more than 10 degrees to satisfy the conditional expression (3) and making the incident angle φy in the direction orthogonal to the direction of split of light in the polarization beam splitter to satisfy the conditional expression (4) facilitate an improvement of contrast of projection images without deterioration of image brightness.

Next, the optical functions of the illumination optical system in Embodiment 1 will be described with reference to FIGS. 2A, 2B and 2C.

White light emitted from the light source 1 is reflected and condensed by the reflector 2 and then enters the first lens array 3.

The entering light is split into plural luminous fluxes by the plural cylindrical lenses that constitute the first lens array 3, and the plural luminous fluxes are transmitted through the second lens array 4 and then enter the polarization conversion element 6. The polarization conversion element 6 is constituted by a polarization beam splitting film 6a, a reflecting film 6b and a half-wave plate 6c as shown in FIG. 2C.

The entering light Lf is split into P-polarized light and S-polarized light by the polarization beam splitting film 6a. The S-polarized light Ls is reflected by the reflecting film 6b in the same direction as that in which the P-polarized light Lp travels. The half-wave plate 6c that is located on the P-polarized light exit side converts the polarization state of the P-polarized light Lp into the same polarization state as that of the S-polarized light Ls.

Thereby, the light exiting from the polarization conversion element 6 is converted into light having a predetermined polarization state. According to the configuration shown in FIGS. 2A and 2B, the light exiting from the polarization conversion element 6 is converted into S-polarized light, and it enters the polarization beam splitter 45 as S-polarized light.

FIG. 2B shows a cross-section in which the entering light is split into plural luminous fluxes by the first lens array 3. In FIG. 2B, the plural luminous fluxes which exited from the polarization conversion element 6 are overlapped with each other by the condenser lens 5 on the reflective liquid crystal display element 42.

On the other hand, in the cross-section shown in FIG. 2A, the luminous flux which exited from the polarization conversion element 6 is condensed by the first cylindrical lens 7 that has optical power in the direction of this cross-section.

On the cross section of FIG. 2A, the luminous flux converted into converging light by the first cylindrical lens 7 is converted into substantially-parallel luminous flux by the second cylindrical lens 8. The second cylindrical lens 8 is located farther than the light-condensing position formed by the first cylindrical lens 7, in other words, located closer to the reflective liquid crystal display element 42. Further, the refractive power of the second cylindrical lens 8 is stronger than that of the first cylindrical lens 7.

Thereby, an illumination state is generated in which the width of the luminous flux is converted from the same width as that of the reflector 2 to the same width as that of the reflective liquid crystal display element 42 and the range of the incident angle θx of the illumination light onto the reflective liquid crystal display element 42 is smaller than the incident angle θy in the cross-section of FIG. 2B (θx<θy).

Figure 3:
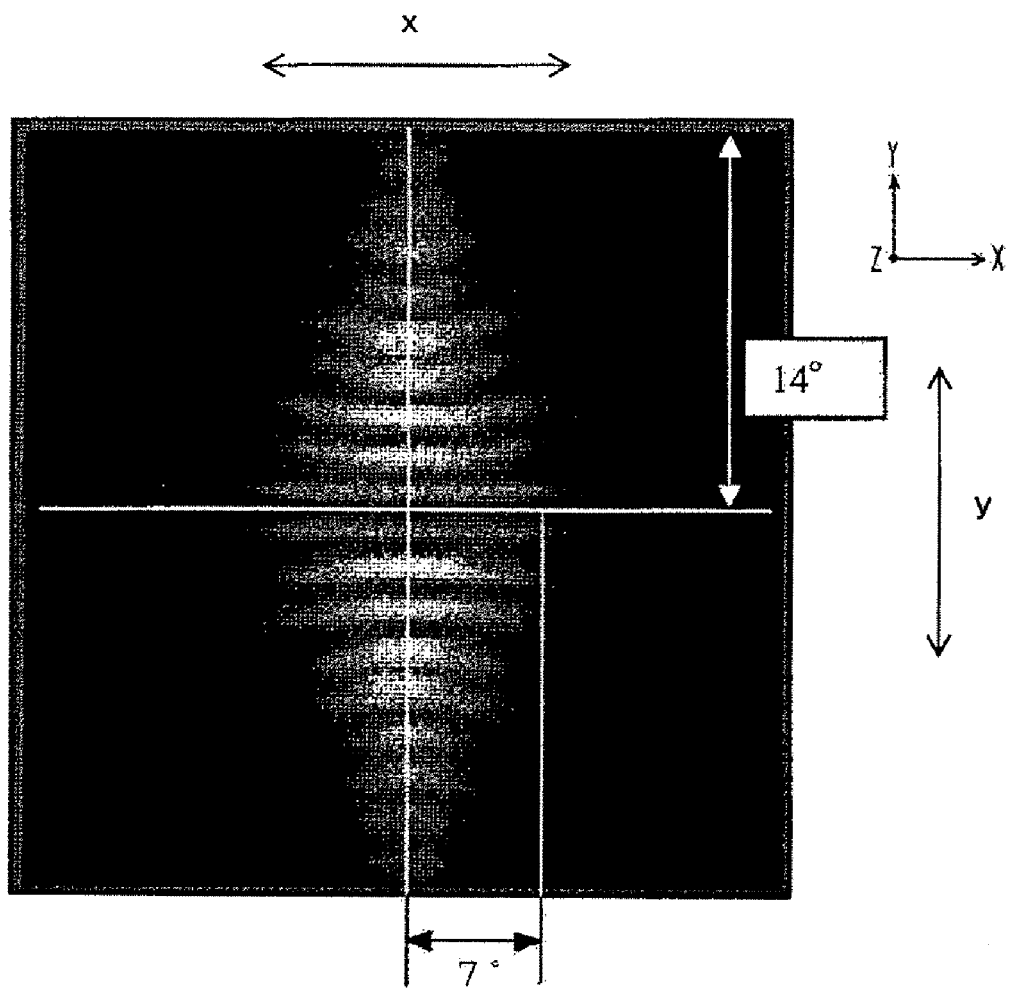
FIG. 3 is an explanatory diagram showing the angular distribution of illumination light incident on the reflective liquid crystal display element shown in FIG. 1.

FIG. 3 shows the light intensity distribution of the illumination optical system according to incident angles onto the reflective liquid crystal display element 42. In FIG. 3, the white part shows the region in which the light intensity is high. The direction in which the incident angle range is narrow (the x direction) is a direction parallel to the XZ cross-section in which the light is split by the polarization beam splitter, and the direction in which the incident angle range is wide (the y direction) is a direction orthogonal to the XZ cross-section. In the x direction, the F-number is about 4 and the maximum incident angle is 7 degrees. In the y direction, the F-number is about 2 and the maximum incident angle is 14 degrees.

As described above, the light condensed by the light condensing effects different between the two cross sectional directions is split into the G light and the R and B light by the dichroic mirror 41.

The G light after its unnecessary polarized light component is cut by the first polarizing plate 47 is transmitted through the first polarization beam splitter 45 and the quarter-wave plate 54 for G and then introduced to the reflective liquid crystal display element 42 for G.

The G light whose polarization state was modulated by the reflective liquid crystal display element 42 for G on the basis of the image for G is analyzed by the first polarization beam splitter 45 and then analyzed by the third polarizing plate 50. After that, the G light is reflected by the dichroic polarization prism 52 to reach the projection lens 53.

On the other hand, the R and B light transmitted through the dichroic mirror 41 enters the color-selective phase plate 49 after its unnecessary polarized light component is cut by the second polarizing plate 48. By the color-selective phase plate 49 the polarization state of the R light is converted into a polarization state which is reflected by the second polarization beam splitter 46. This R light is reflected by the second polarization beam splitter 46, transmitted through the quarter-wave plate 55 for R and then introduced to the reflective liquid crystal display element 43 for R.

The B light is transmitted through the second polarization beam splitter 46 and the quarter-wave plate 56 for B and then introduced to the reflective liquid crystal display element 44 for B.

The R light whose polarization state was modulated by the reflective liquid crystal display element 43 for R on the basis of the image for R is analyzed by the second polarization beam splitter 46 and then analyzed by the dichroic polarization prism 52 to reach the projection lens 53.

The B light whose polarization state was modulated by the reflective liquid crystal display element 44 for B on the basis of the image for B is analyzed by the second polarization beam splitter 46 and then analyzed by the fourth polarizing plate 51. After that, the B light is transmitted through the dichroic polarization prism 52 to reach the projection lens 53.

The projection lens 53 projects image information which is based on the reflective liquid crystal display elements 42 to 44 onto the screen S.

The quarter-wave plates 54 to 56 are made of quartz, and each of them has a structure that two phase plates whose fast axes form an angle of 90 degrees are cemented together. In the phase plate made of quartz, as shown in FIG. 4, the phase of the entering light is changed according to incident angles in a quadratic curve manner, and the positive and negative of the change amount of phase difference varies depending on directions of incidence.

Figure 4:
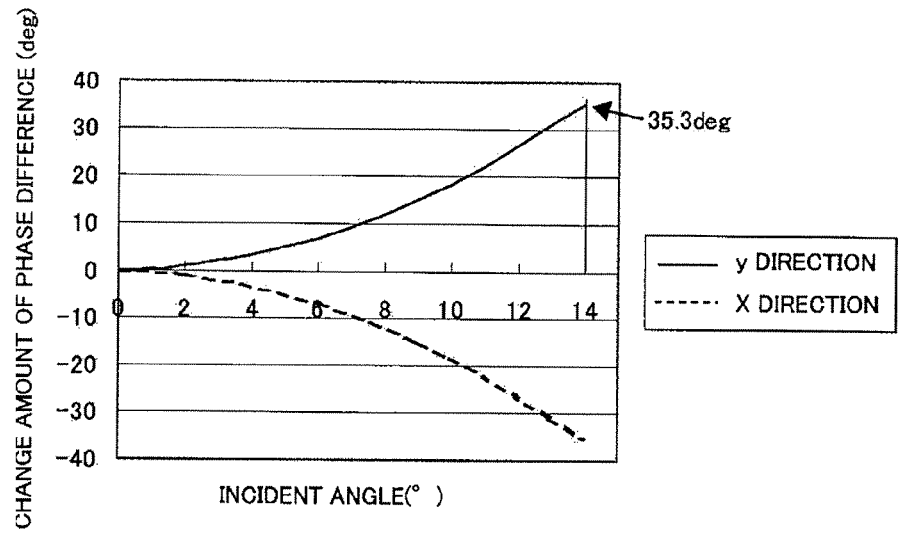
FIG. 4 is an explanatory diagram showing the incident angle characteristic of a phase plate.

FIG. 4 shows a case where the phase difference is 90 degrees at an incident angle of 0 degree. In such a characteristic, the phase difference significantly shifts from 90 degrees at a large incident angle.

When the incident angle ϕy at which the phase difference at the principal wavelength given by the phase plate is a ¼ phase (that is, 90 degrees) is 14 degrees in the y direction, the change amount of phase difference is an angle of 35.3 degrees in FIG. 4. Consequently, setting the phase difference at normal incidence to 54.7 degrees (=90−35.3 degrees) makes it possible to obtain a phase difference of 90 degrees at the incident angle ϕy.

Figure 5:
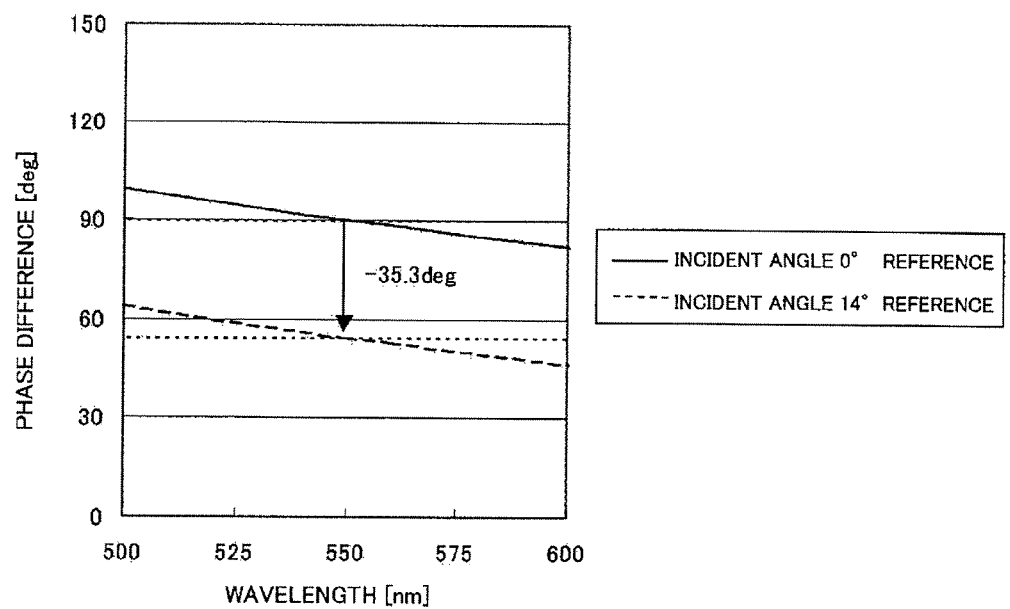
FIG. 5 is an explanatory diagram showing the phase difference for normal incidence in the present invention.

FIG. 5 shows a wavelength characteristic for normal (0 degree) incidence when the incident angle ϕy at which the phase difference of light with a principal wavelength of 550 nm given by the phase plate in the y direction is a ¼ phase (90 degrees) is set as above.

From FIG. 5, the phase difference at normal incidence (that is, at the incident angle of 0 degree) is 54.7 degrees. In the x direction in which the incident angle range is narrow, the phase difference shifts from the ¼ phase. However, leakage light can be reduced in this direction since the incident angle range is narrow.

In this case, it is preferable to set the incident angle ϕy to be within the following range:

$5° < \phi y < 15°$.

In this embodiment, in each of R, G and B wavelength regions, a wavelength at which the sensitivity obtained by multiplying the intensity distribution of the illumination light by the spectral luminous efficiency is highest is selected as the principal wavelength.

Figure 6:
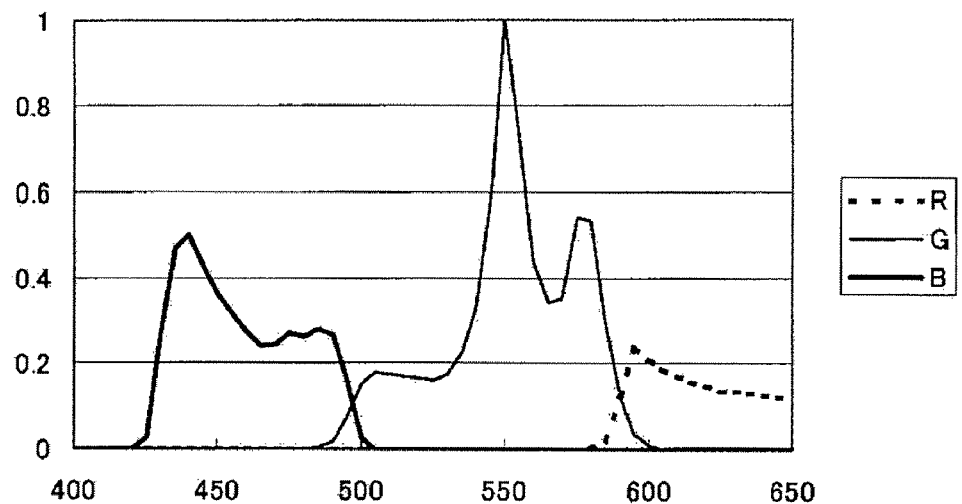
FIG. 6 is an explanatory diagram showing the spectral distribution of the image projection apparatus shown in FIG. 1.
Figure 7:
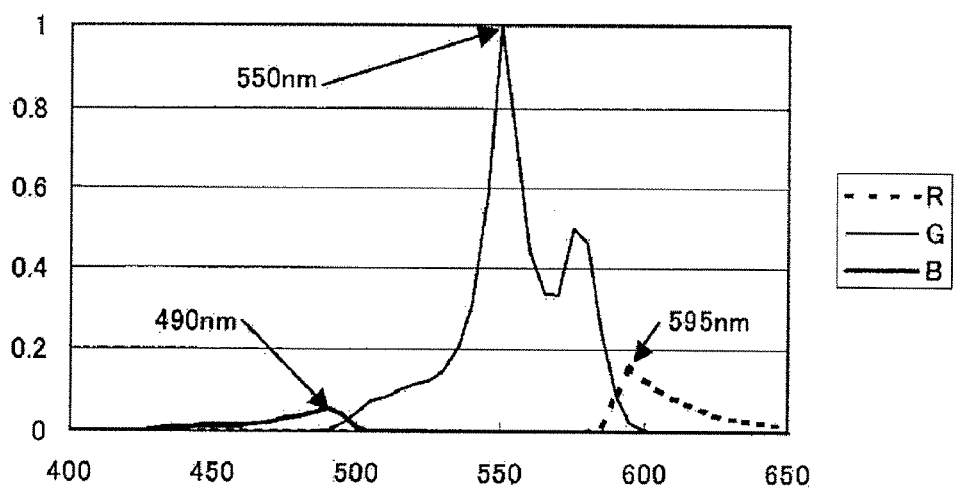
FIG. 7 is an explanatory diagram showing the principal wavelength at which a phase difference in the present invention is obtained.

In a case where, for example, R, G and B having wavelength distributions as shown in FIG. 6 are used, the spectral distribution as shown in FIG. 7 is obtained by multiplying the intensity distribution by the spectral luminous efficiency.

From FIG. 7, the principal wavelengths are:

490 nm for B;
550 nm for G; and
595 nm for R.

In this embodiment and the following embodiments, transmissive liquid crystal display elements may be used as the image display elements.

Embodiment 2

Figure 8:
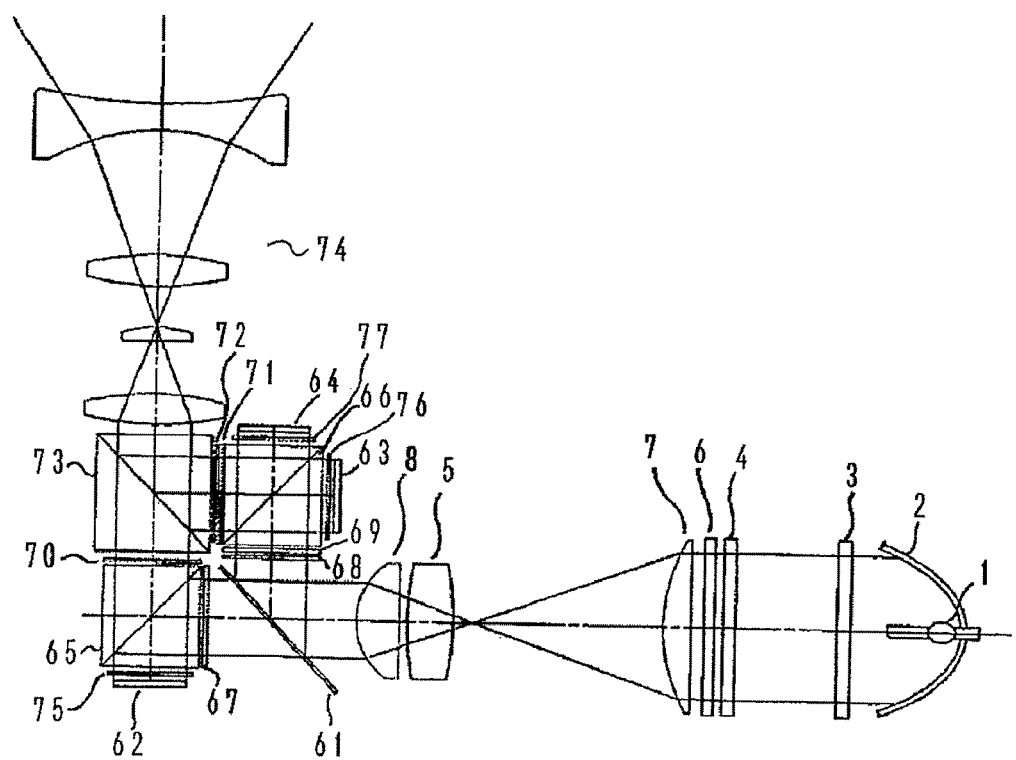
FIG. 8 is a schematic view showing the main part of the image projection apparatus that is Embodiment 2 of the present invention.

FIG. 8 schematically shows the configuration of the main part of the image projection apparatus that is Embodiment 2 of the present invention. Although the configuration of a color separation/combination system of this embodiment is different from that of Embodiment 1, other configurations of this embodiment are the same as those of Embodiment 1. Components identical to those in Embodiment 1 are designated with the same reference numerals as those in Embodiment 1.

A description will hereinafter be made mainly of the difference in Embodiment 2 from Embodiment 1.

In FIG. 8, 61 denotes a dichroic mirror. 62, 63 and 64 denote reflective liquid crystal display elements which display images for G, R and B, respectively. 65 and 66 denote first and second polarization beam splitters, respectively.

67 and 68 denote first and second polarizing plates, respectively. 69 denotes a first color-selective phase plate which converts the polarization of B light by 90 degrees and does not convert the polarization state of R light. 70 and 72 denote third and fourth polarizing plates, respectively.

71 denotes a second color-selective phase plate which converts the polarization state of the R light by 90 degrees and does not convert the polarization state of the B light. 73 denotes a polarization beam splitter which transmits G light and reflects the B and R light. 74 denotes a projection lens (or projection optical system). 75, 76 and 77 denote phase plates made of quartz for G, R and B, respectively.

Light from the light source 1 is split into the G light and the R and B light. The G light after its unnecessary polarized light component is cut by the first polarizing plate 67 is reflected by the first polarization beam splitter 65, transmitted through the quarter-wave plate 75 for G and then introduced to the reflective liquid crystal display element 62 for G.

The G light whose polarization state was modulated by the reflective liquid crystal display element 62 for G on the basis of the image for G is analyzed by the first polarization beam splitter 65 and then analyzed by the third polarizing plate 70. After that, the G light is transmitted through the polarization beam splitter 73 to reach the projection lens 53.

The R and B light transmitted through the dichroic mirror 61 enters the first color-selective phase plate 69 after its unnecessary polarized light component is cut by the second polarizing plate 68. The R light is transmitted through the first color-selective phase plate 69 without a change of its polarization state, reflected by the second polarization beam splitter 66, transmitted through the quarter-wave plate 76 for R and then introduced to the reflective liquid crystal display element 63 for R.

The polarization state of the B light is converted into a polarization state which is transmitted through the second polarization beam splitter 66. This B light is transmitted through the second polarization beam splitter 66 and the quarter-wave plate 77 for B and then introduced to the reflective liquid crystal display element 64 for B.

The R light whose polarization state was modulated by the reflective liquid crystal display element 63 for R on the basis of the image for R, after its polarization state is changed by the second color-selective phase plate 71, is analyzed by the fourth polarizing plate 72 and then transmitted through the polarization beam splitter 73 to reach the projection lens 74.

The B light whose polarization state was modulated by the reflective liquid crystal display element 64 for B on the basis of the image for B is analyzed by the second polarization beam splitter 66 and then analyzed by the fourth polarizing plate 72. After that, the B light is transmitted through the polarization beam splitter 73 to reach the projection lens 74.

That is the configuration of the color separation/combination system in Embodiment 2.

Embodiment 3

Figure 9:
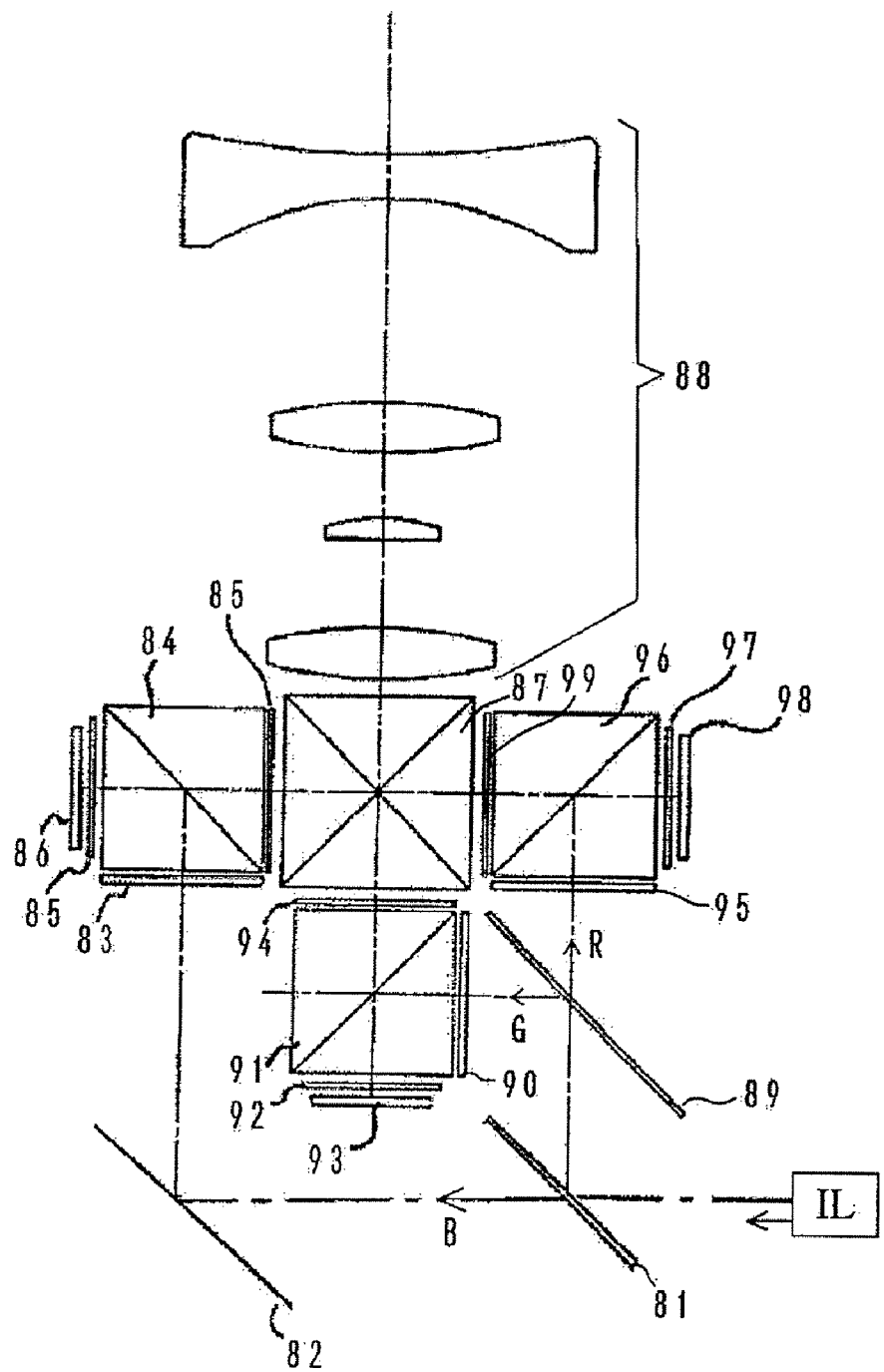
FIG. 9 is a schematic view showing the main part of the image projection apparatus that is Embodiment 3 of the present invention.

FIG. 9 schematically shows the configuration of the main part of the image projection apparatus that is Embodiment 3 of the present invention.

FIG. 9 mainly shows the color separation/combination system.

White light from an illumination optical system (abbreviated as IL in the figure) is split into B light and R and G light by a first dichroic mirror 81. The B light transmitted through the first dichroic mirror 81 is reflected by a mirror 82 and then enters a first polarizing plate 83.

The B light, after its unnecessary polarized light component is cut by the first polarizing plate 83, is reflected by a first polarization beam splitter 84, transmitted through a quarter-phase plate 85 for B and then introduced to a reflective liquid crystal display element 86 for B.

The B light whose polarization state was modulated by the reflective liquid crystal display element 86 for B on the basis of an image for B is analyzed by the first polarization beam splitter 84 and then analyzed by the second polarizing plate 85. After that, the B light is reflected by a color combination prism 87 to reach a projection lens 88.

The R and G light reflected by the first dichroic mirror 81 is split into the G light and the R light by a second dichroic mirror 89.

The G light reflected by the second dichroic mirror 89 enters a third polarizing plate 90.

The G light, after its unnecessary polarized light component is cut by the third polarizing plate 83, is reflected by a second polarization beam splitter 91, transmitted through a quarter-phase plate 92 for G and then introduced to a reflective liquid crystal display element 93 for G.

The G light whose polarization state was modulated by the reflective liquid crystal display element 93 for G on the basis of an image for G is analyzed by the second polarization beam splitter 91 and then analyzed by a fourth polarizing plate 94. After that, the G light is transmitted through the color combination prism 87 to reach the projection lens 88.

The R light transmitted through the second dichroic mirror 89 enters a fifth polarizing plate 95. The R light, after its unnecessary polarized light component is cut by the fifth polarizing plate 95, is reflected by a third polarization beam splitter 96, transmitted through a quarter-phase plate 97 for R and then introduced to a reflective liquid crystal display element 98 for R.

The R light whose polarization state was modulated by the reflective liquid crystal display element 98 for R on the basis of an image for R is analyzed by the third polarization beam splitter 96 and then analyzed by a sixth polarizing plate 99. After that, the R light is reflected by the color combination prism 87 to reach the projection lens 88.

That is the configuration of the color separation/combination system in Embodiment 3.

Although the phase plates made of quartz are used in each of the above-described embodiments, phase plates made of a stretched film instead of quartz may be used.

Next, a modified example of the configuration of the image projection apparatus of each embodiment will be described.

Figure 10:
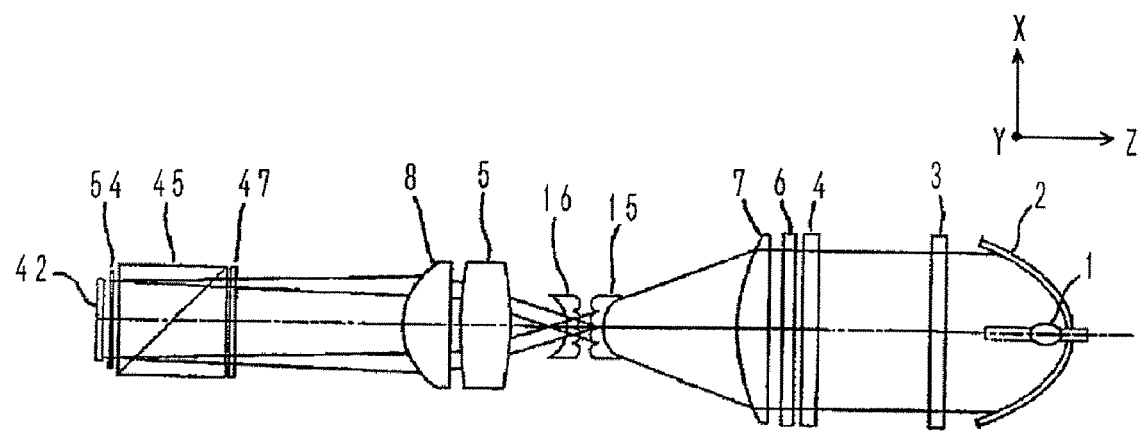
FIG. 10 is an explanatory diagram showing a modified example of the illumination optical system that is another embodiment of the present invention.

An illumination optical system as shown in FIG. 10 may be used in Embodiments 1 and 2, instead of one shown in FIGS. 2A and 2B.

In FIG. 10, third and fourth lens arrays 15 and 16 are provided at the light-condensing position of the first cylindrical lens 7 or in the vicinity thereof. Each of the third and fourth lens arrays 15 and 16 is constituted by plural cylindrical lenses that are arranged in a cross sectional direction different from that in which the cylindrical lenses of the first lens array 3 are arranged.

Plural luminous fluxes split by the third lens array 15 are overlapped with each other on the reflective liquid crystal display element 42 by the fourth lens array 16, the condenser lens 5 and the second cylindrical lens 8.

Also In this case, an illumination optical system can be achieved in which the incident angle of light onto the reflective liquid crystal display element 42 is small in the cross sectional direction in which the light is condensed by the first cylindrical lens 7.

Further, instead of the cylindrical lens and the cylindrical lens array, a toric lens can be used which has a large optical power in one cross-section and a small optical power in the other cross-section.

Figure 11A:
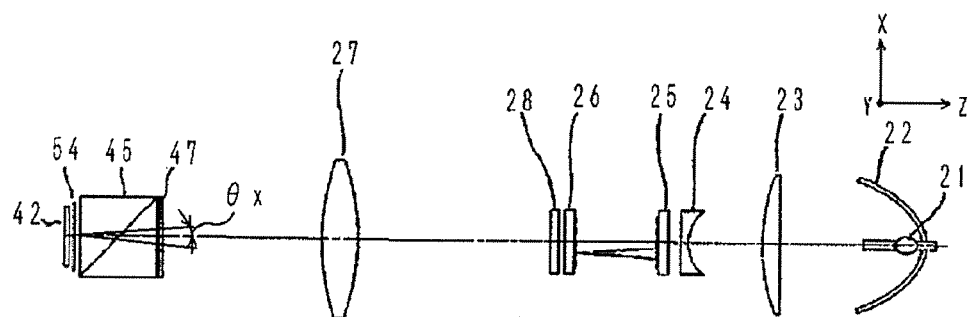
FIGS. 11A and 11B are explanatory diagrams showing another modified example of the illumination optical system that is yet another embodiment of the present invention.
Figure 11B:
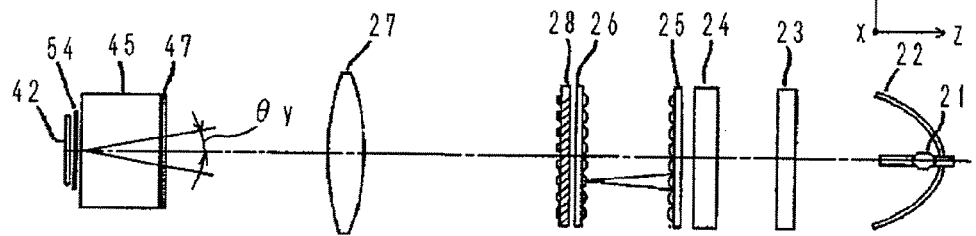
Figure 12:
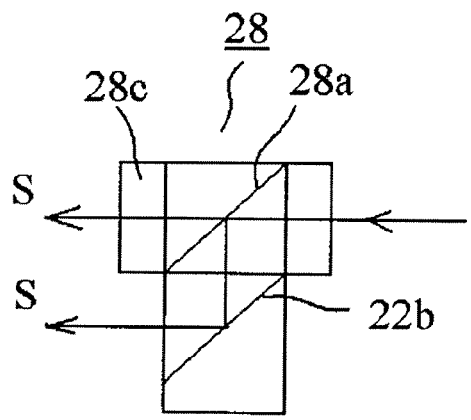
FIG. 12 is an explanatory diagram showing the polarization conversion element in FIGS. 11A and 11B.

Moreover, as another modified example, an illumination optical system having the configuration shown in FIGS. 11A and 11B can be employed. In these figures, 21 denotes a light source, and 22 a reflector. 23 and 24 denote first and second cylindrical lenses each of which has optical power in the XZ cross-section.

25 and 26 denote first and second lens arrays each of which is constituted by plural lenses each having optical power in the YZ cross-section. 27 denotes a condenser lens.

28 denotes a polarization conversion element which converts non-polarized light into polarized light having a predetermined polarization direction. 45 denotes a polarization beam splitter, 54 a quarter-wave plate, 42 a reflective liquid crystal display element, and 47 a first polarizing plate.

The optical functions of the illumination optical system shown in FIGS. 11A and 11B will be described. In these figures, white light emitted from the light source 21 is reflected and condensed by the reflector 22 and then enters the first cylindrical lens 23. The light is condensed only in a predetermined cross sectional direction (the X direction) by the first cylindrical lens 23.

The second cylindrical lens 24 has a function which converts the luminous flux from the first cylindrical lens 23 into a substantially parallel luminous flux. Then the parallel luminous flux whose width is compressed only in the predetermined cross sectional direction enters the first lens array 25.

The entering light is split into plural luminous fluxes by the lenses constituting the first lens array 25 in the cross sections shown in FIGS. 11A and 11B. The plural luminous fluxes are transmitted through the second lens array 26 and then enter the polarization conversion element 28.

The polarization conversion element 28 is constituted by a polarization beam splitting film 28a, a reflecting film 28b and a half-phase plate 28c.

The polarization conversion element 28 splits the entering light into P-polarized light and S-polarized light by the polarization beam splitting film 28a. The S-polarized light is reflected by the reflecting film 28b in the same direction as that in which the P-polarized light travels. The half-wave plate 28c that is located on the P-polarized light exit side converts the polarization state of the P-polarized light into the same polarization state as that of the S-polarized light. Thereby, the light exiting from the polarization conversion element 28 is converted into light having the predetermined polarization state.

The plural luminous fluxes which were split by the first lens array 25 and then exited from the polarization conversion element 28 are overlapped with each other on the reflective liquid crystal display element 42 by the condenser lens 27. Thereby, an illumination state is generated in which the range of the angle of the light incident on the reflective liquid crystal display element 42 in the cross-section (FIG. 11A) in which the light is condensed by the first cylindrical lens 23 is smaller than that in the cross-section orthogonal thereto. In other words, an illumination state in which the condition $\theta x < \theta y$ is satisfied is generated.

As described above, according to each of the embodiments, an illumination optical system and an image projection apparatus can be achieved which are capable of uniformly illuminating the liquid crystal display element and projecting a bright image with high contrast.

Furthermore, the present invention is not limited to these preferred embodiments and various variations and modifications may be made without departing from the scope of the present invention.

This application claims foreign priority benefits based on Japanese Patent Application No. 2005-295183, filed on Oct. 7, 2005, which is hereby incorporated by reference herein in its entirety as if fully set forth herein.

What is claimed is:

1. An illumination optical system comprising:
   a light source;
   a polarization conversion element which converts a luminous flux from the light source into a luminous flux having a certain polarization direction;
   a polarization beam splitter which splits the luminous flux from the polarization conversion element on the basis of the polarization state of the luminous flux; and
   a phase plate which gives a phase difference to the luminous flux from the polarization beam splitter,
   wherein the illumination optical system illuminates a surface to be illuminated with the luminous flux from the phase plate and satisfies the following conditions:

$\theta x < \theta y$ $0° < \phi y \leq \theta y$ where a direction which is orthogonal to one of fast and slow axes of the phase plate and in which the luminous flux is reflected and split by the polarization beam splitter is defined as the x direction, a direction which is orthogonal to the other of the fast and slow axes and to the x direction is defined as the y direction, $\theta x$ and $\theta y$ represent the maximum incident angles of the luminous flux onto the surface to be illuminated in the x and y directions, respectively, and $\phi y$ represents an incident angle of the luminous flux onto the phase plate at which the phase difference at a principal wavelength of the luminous flux that passes through the phase plate is 90 degrees.

2. The illumination optical system according to claim 1, further comprising a luminous flux splitting member which splits the luminous flux from the light source into plural luminous fluxes.

3. The illumination optical system according to claim 1, wherein the illumination optical system further satisfies the following conditions:

$10° < \theta y$ $\theta y/2 < \phi y \leq \theta y$.

4. An image projection apparatus comprising:
   an image display element;
   an illumination optical system which illuminates the image display element; and
   a projection optical system which projects a luminous flux from the image display element onto a projection surface,
   wherein the illumination optical system comprises:
   a light source;
   a polarization conversion element which converts a luminous flux from the light source into a luminous flux having a certain polarization direction;
   a polarization beam splitter which splits the luminous flux from the polarization conversion element on the basis of the polarization state of the luminous flux; and
   a phase plate which gives a phase difference to the luminous flux from the polarization beam splitter,
   wherein the illumination optical system illuminates the image display element with the luminous flux from the phase plate and satisfies the following conditions:

$\theta x < \theta y$ $0° < \phi y \leq \theta y$ where a direction which is orthogonal to one of fast and slow axes of the phase plate and in which the luminous flux is reflected and split by the polarization beam splitter is defined as the x direction, a direction which is orthogonal to the other of the fast and slow axes and to the x direction is defined as the y direction, $\theta x$ and $\theta y$ represent the maximum incident angles of the luminous flux onto the image display element in the x and y directions, respectively, and $\phi y$ represents an incident angle of the luminous flux onto the phase plate at which the phase difference at a principal wavelength of the luminous flux that passes through the phase plate is 90 degrees.

5. The image projection apparatus according to claim 4, wherein the image display element is a reflective liquid crystal display element.

* * * * *